J. DAVIDSON.
MANUFACTURE OF A FISH FOOD.
APPLICATION FILED JUNE 13, 1912.
1,047,760.
Patented Dec. 17, 1912.
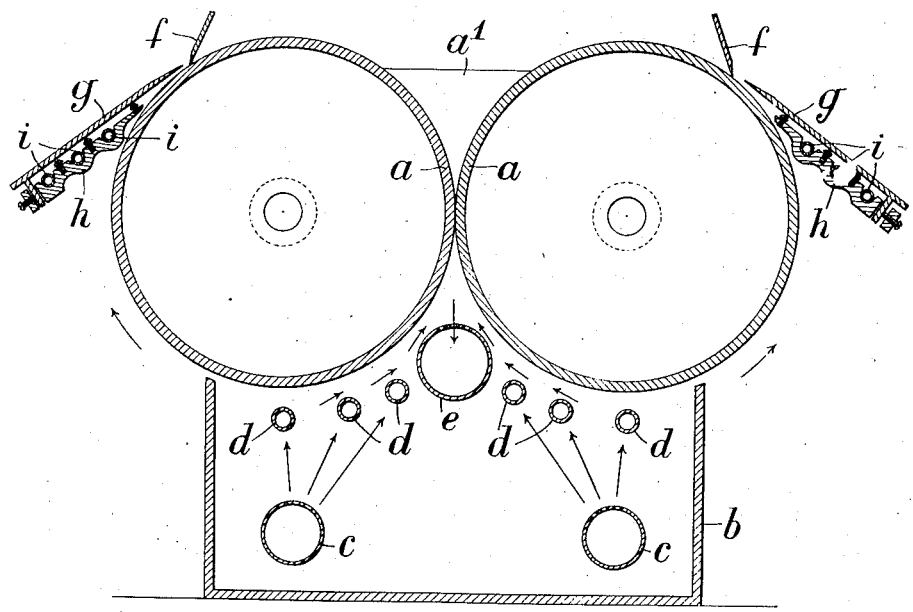

UNITED STATES PATENT OFFICE.

JOHN DAVIDSON, OF WICK, SCOTLAND.

MANUFACTURE OF A FISH FOOD.

1,047,760.  Specification of Letters Patent.  Patented Dec. 17, 1912.

Application filed June 13, 1912. Serial No. 703,500.

*To all whom it may concern:*

Be it known that I, JOHN DAVIDSON, a subject of the King of Great Britain, residing at Wick, Scotland, have invented new and useful Improvements in the Manufacture of a Fish Food, of which the following is a specification.

This invention relates to an improved method of preparing sterilized fish in the form of dry flakes which can be used in a variety of ways for preparing dishes for the table.

My improved method is of the kind wherein the entrails, skin and large bones are removed from the fish, and the remaining flesh or edible portion of the fish is treated or worked in a mincing machine or the like to reduce it to a pulp, which is then mixed with flour, again worked and dried, the product being brought into the market in the form of flakes.

According to the present invention, I adapt to the drying of a fish food of the kind above mentioned, a known type of drying machine, comprising for example, two rotary heated rollers arranged close together on to which the material to be dried is fed in a fluid form and from which it is removed by stripping knives or scrapers.

According to my improved method the entrails, skin and large bones are removed from the fish and the remaining flesh is then thoroughly washed and passed once, twice or oftener through a mincing machine which reduces the flesh to a pulp, and breaks down the cell structure. To this is then added 15% or thereabout of a starchy powder preferably equal parts of tapioca flour and corn-flour, which powder before being added to the fish is preferably mixed with water to reduce it to the consistency of milk. When the fish and the flour and water are mixed, the combination is thoroughly worked and then allowed to stand for a few hours, to allow the starchy material to become thoroughly steeped. I then proceed to cook, dry and sterilize this mixture as hereinafter described, whereby while producing a dried fish preparation which retains the full flavor of the fish I am enabled to prevent such changes in the product as would cause it to acquire a strong fishy odor and taste.

For the purposes of my invention, I employ two hollow metal rollers or cylinders mounted in a frame which keeps them pressed together, and heated by steam or otherwise to a temperature slightly above the cooking temperature of the fish under treatment, and I pour the raw mixture above described in the space between the rollers, which are kept slowly revolving. The mass of fish resting on the rollers undergoes a cooking operation due to the heat, and the thin layer of the fish mixture which passes between the rollers and adheres to the surfaces thereof is further cooked and partially dried by direct contact with the rollers. While the film adheres to each roller, a current of heated air is directed on to the same to assist or increase the rate of evaporation of moisture from the mixture to quickly remove the moisture thus evolved, and to thoroughly sterilize the mixture. The rotation of the rollers brings the films of fish material adhering thereto into contact with stripping knives or scrapers which remove the said material and deliver it to auxiliary heating surfaces arranged near to said knives and whereon the drying of the material is completed. The sheets then fall into a box or other receptacle arranged to receive them in a condition in which they are not liable to stick together and in which they can be readily broken up into flakes after cooling. They are then kept for some time exposed to the air to cool and mature.

In the accompanying drawing, I have shown, diagrammatically, an apparatus for conveniently and advantageously carrying into practice the manufacture of my improved fish food preparation.

As shown in this drawing, $a$, $a$ indicate rollers heated by steam or otherwise and arranged substantially in contact with each other, the space above and between said rollers being shut in at the ends by plates $a'$. Below the rollers $a$, $a$ is arranged a chamber or box $b$ inclosing inlet air ducts conveying air under pressure which is supplied and directed on to the surfaces of the rollers or on to the films of fish material thereon by nozzles or jet apertures $c$. Between the nozzles $c$ and the rollers $a$, a series of steam pipes or heating coils $d$ are provided. An exhaust pipe $e$ connected, for example, to a fan, withdraws the air supplied to the surfaces of the rollers or films. If desired, the nozzles $c$, $c$ can be dispensed with and the air be drawn in by the suction of the exhaust pipe $e$ through spaces left between the peripheries of the rollers $a$, $a$, and the upper edges of the side walls of the box $b$.

Stripping knives indicated at *f, f* remove the films from the rollers after the said films have been cooked and partially dried, and after they have been treated by directing hot air on to or over the same. The films stripped off by the knives *f* fall on to auxiliary heating surfaces *g* formed by metal plates respectively supported at a short distance from the delivery edge of each stripping knife out of contact with the corresponding roller.

A suitable supporting frame for each plate *g* is indicated at *h* and heating pipes *i* are provided to maintain the plates *g* at a suitable temperature. These plates may, however, be heated by conduction or radiation of heat from the rollers, by means of gas flames, or in any other convenient manner.

What I claim is:—

1. A method of manufacturing a fish food preparation, wherein the flesh of fish after having been reduced to a pulp, is mixed with a starchy powder and water, and the mixture is poured into the space above a pair of revolving heated pressure rollers where it undergoes a cooking operation, and then passes between the rollers to which it adheres in thin layers being thereby sterilized and partially dried, the thin layers of material being subsequently removed from the rollers by means of stripping knives and delivered to auxiliary heating surfaces whereby they are completely dried.

2. A method of manufacturing a fish food preparation, wherein the flesh of fish, after having been reduced to a pulp, is mixed with a starchy powder and water which has been brought to the consistency of milk before it is mixed with the fish pulp, whereupon the mixture is worked, allowed to stand and then poured into the space above a pair of revolving heated pressure rollers, where it undergoes a cooking operation and then passes between the rollers to which it adheres in thin layers, being thereby sterilized and partially dried, the said layers of material being subsequently removed from the rollers and completely dried on auxiliary heating surfaces.

3. A method of manufacturing a fish food preparation, wherein the flesh of fish, after being reduced to a pulp, is mixed with a starchy powder and water and the mixture is poured into the space above a pair of revolving heated pressure rollers, where it undergoes a cooking operation, and then passes between the rollers, to which it adheres in thin layers, being there subjected to the action of a current of heated air until it is sterilized and partially dried, the thin layers of material being subsequently removed from the rollers and completely dried on auxiliary heating surfaces.

JOHN DAVIDSON.

Witnesses:
JAMES WHITELAW,
FREDERICK PIATT.